US012576791B2

(12) United States Patent
Wronski et al.

(10) Patent No.: US 12,576,791 B2
(45) Date of Patent: Mar. 17, 2026

(54) BICYCLE RACK

(71) Applicant: NRTV COLLAB INC., Orange, CA (US)

(72) Inventors: Luke Benjamin Wronski, Costa Mesa, CA (US); Eric Reed Ichiro Pyle, Orange, CA (US); Jonah Masumoto, Irvine, CA (US)

(73) Assignee: NRTV COLLAB INC., Orange, CA (US)

( * ) Notice: Subject to any disclaimer, the term of this patent is extended or adjusted under 35 U.S.C. 154(b) by 142 days.

(21) Appl. No.: 18/193,153

(22) Filed: Mar. 30, 2023

(65) Prior Publication Data

US 2023/0331171 A1     Oct. 19, 2023

Related U.S. Application Data

(60) Provisional application No. 63/330,688, filed on Apr. 13, 2022.

(51) Int. Cl.
B60R 9/10          (2006.01)
B60R 9/06          (2006.01)

(52) U.S. Cl.
CPC . B60R 9/10 (2013.01); B60R 9/06 (2013.01)

(58) Field of Classification Search
CPC ................................... B60R 9/10; B60R 9/06
See application file for complete search history.

(56) References Cited

U.S. PATENT DOCUMENTS

| | | | |
|---|---|---|---|
| 6,523,731 B1 * | 2/2003 | Pedrini ..................... | B60R 9/10 224/310 |
| 6,761,297 B1 * | 7/2004 | Pedrini ..................... | B60R 9/10 224/570 |
| 9,073,492 B1 * | 7/2015 | Shen ......................... | B60R 9/10 |
| 10,577,040 B1 * | 3/2020 | Goates ..................... | B62H 3/12 |
| 2007/0000962 A1 * | 1/2007 | Reeves ..................... | B60R 9/06 224/536 |
| 2007/0164065 A1 * | 7/2007 | Davis ........................ | B60R 9/10 224/324 |
| 2016/0039354 A1 * | 2/2016 | Settelmayer .............. | B60R 9/10 224/324 |
| 2016/0068111 A1 * | 3/2016 | Walker ..................... | B60R 9/10 224/521 |
| 2017/0349111 A1 * | 12/2017 | Ramsdell .................. | B60R 9/06 |
| 2018/0050645 A1 * | 2/2018 | Phillips .................... | B60R 9/06 |
| 2018/0072237 A1 * | 3/2018 | Kuschmeader ........... | B60R 9/10 |
| 2020/0047679 A1 * | 2/2020 | Westcott .................. | B60R 9/06 |
| 2020/0406830 A1 * | 12/2020 | Owen ....................... | B62H 3/12 |

* cited by examiner

*Primary Examiner* — Derek J Battisti
(74) *Attorney, Agent, or Firm* — VIA LLP

(57)          ABSTRACT

A bicycle rack, including a frame and a wheel tray. The wheel tray is configured to contact a wheel of the bicycle in a pair of locations spaced from one another in a circumferential direction of the wheel. A wheel clamp assembly includes a post supported by the frame. A slider clamp is supported by and movable along the post. The slider clamp comprises a tire engagement surface and is configured to apply a force to the wheel in a direction that secures the wheel within the wheel tray. A retention arrangement of the bicycle rack, or another apparatus, includes a wedge member having a first angled surface that engages a second angled surface of the support portion. The retention arrangement includes a bolt that engages a nut, which is secured to a hitch pin of the vehicle's hitch receiver.

21 Claims, 9 Drawing Sheets

BICYCLE RACK

INCORPORATION BY REFERENCE TO ANY PRIORITY APPLICATIONS

Any and all applications for which a foreign or domestic priority claim is identified in the Application Data Sheet as filed with the present application are hereby incorporated by reference herein and made a part of the present disclosure.

BACKGROUND

Field

The present disclosure relates generally to vehicle accessories. In particular, the present disclosure relates to bicycle racks and hitch mount arrangements.

Description of Related Art

Many types of vehicle bicycle racks are currently in use. However, many such bicycle racks have drawbacks, such as having difficulty accommodating or being unable to accommodate at least some of the many different bicycle frame designs on the market, or may be completely incompatible with certain frame designs. Furthermore, some bicycle racks have difficulty or are unable to securely hold a bicycle if the bicycle rack is subjected to significant forces, such as if the vehicle to which the bicycle rack is mounted is driven off-road. In addition, some bicycle racks are prone to contacting vulnerable portions of the bicycle and causing damage to the bicycle as a result of relative movement therebetween, such as movement resulting from vibrations.

SUMMARY

A need exists for bicycle racks that overcome at least some of the drawbacks of the prior art, or at least provide the public with a useful choice. The systems, methods and devices described herein have innovative aspects, no single one of which is indispensable or solely responsible for their desirable attributes. Without limiting the scope of the claims, some of the advantageous features will now be summarized.

An aspect of the present disclosure involves a bicycle rack, including a frame and a wheel tray supported by the frame. The wheel tray is configured to receive a wheel of a bicycle supported by the bicycle rack and to contact the wheel in a pair of locations spaced from one another in a circumferential direction of the wheel. A wheel clamp assembly is associated with the first wheel tray. The wheel clamp assembly includes a post supported by the frame. A slider clamp is supported by and movable along the post. The slider clamp comprises a tire engagement surface configured to engage a tire of the wheel of the bicycle supported by the bicycle rack. The post and the slider clamp are configured such that the tire engagement surface applies a force to the wheel in a direction that extends between the pair of locations.

In some configurations, the direction extends within a center third of a distance between the pair of locations.

In some configurations, the direction extends through a center point of a distance between the pair of locations.

In some configurations, the post is supported for pivotable movement relative to the frame about a pivot axis, and wherein the direction passes through the pivot axis.

In some configurations, the post is configured to be secured in an operational position relative to the frame.

In some configurations, the post is movable to a stowed position relative to the frame.

In some configurations, in the operational position the post is generally perpendicular to a line passing through the axes of the wheels of the bicycle supported by the rack.

In some configurations, the frame comprises a linear tube and wherein in the operational position the post is generally perpendicular to the linear tube of the frame.

In some configurations, the frame comprises a linear tube and a hitch mount portion, wherein the linear tube is slideably supported by the hitch mount portion to allow for adjustment of the linear tube relative to the hitch mount portion.

In some configurations, the slider clamp comprises a support portion slideably supported by the post, wherein the support portion has a proximal extent nearest an end of the post supported by the frame and a distal extent further from the end of the post supported by the frame, wherein the tire engagement surface is positioned between the proximal extent and the distal extent along the post.

In some configurations, the slider clamp comprises a first wall spaced from a second wall, and wherein the post is positioned between the first wall and the second wall.

In some configurations, each of the first wall and the second wall include an opening located between the post and the tire engagement surface and in alignment with one another, wherein a handle that releases the slider clamp for movement relative to the post is located within the openings.

In some configurations, the slider clamp defines a hand engagement surface opposite the openings for grasping by a hand of a user of the bicycle rack.

In some configurations, the slider clamp comprises another hand engagement surface located on a surface opposite the tire engagement surface.

In some configurations, the frame comprises a mount portion configured to be received within the hitch receiver of the vehicle, wherein the mount portion comprises a wedge retention arrangement.

In some configurations, the wedge retention arrangement comprises a wedge member having a first angled surface that engages a second angled surface of the support portion of the bicycle rack, and a bolt that engages a nut, wherein the nut is secured to a hitch pin of the hitch receiver of the vehicle.

An aspect of the present disclosure involves a retention arrangement of an apparatus supported by a hitch receiver of a vehicle. The hitch receiver includes an outer wall defining an interior space. The retention arrangement includes a hitch insert configured to be inserted into the interior space of the hitch receiver. The hitch insert includes a first angled surface. A wedge block includes a second angled surface. The retention arrangement also includes a bolt and a nut. The nut includes a through-hole configured to receive a hitch receiver pin to secure the nut relative to the hitch receiver. In use, the bolt is engaged with the nut and the second angled surface of the wedge block contacts the first angled surface of the hitch insert. The bolt applies a force to the wedge block to move the wedge block relative to the hitch insert with the first angled surface sliding along the second angled surface such that opposing surfaces of the hitch insert and the wedge block are forced against the opposing sides of the outer wall of the hitch receiver to secure the hitch insert to the hitch receiver.

In some configurations, a spherical washer set is interposed between a head of the bolt and the wedge block.

In some configurations, the hitch insert extends from a first end of the hitch receiver towards the apparatus and the bolt is accessible from a second end of the hitch receiver opposite the first end.

In some configurations, a longitudinal axis of the bolt is aligned with a longitudinal axis of the hitch receiver.

In some configurations, a longitudinal axis of the bolt is perpendicular with a longitudinal axis of the hitch receiver pin.

In some configurations, the wedge block comprises a recess configured to accommodate a portion of the nut.

In some configurations, the apparatus is a bicycle rack.

An aspect of the present disclosure involves a bicycle rack including a frame and a first wheel tray supported by the frame. The first wheel tray comprises a first ramp surface and a second ramp surface facing one another to define a cavity configured to receive a wheel of a bicycle supported by the bicycle rack. The first wheel tray is symmetrical about a central plane passing laterally through the first wheel tray. A second wheel tray is supported by the frame at a spaced location from the first wheel tray. A wheel clamp assembly is associated with the first wheel tray. The wheel clamp assembly includes a post supported by the frame and a slider clamp supported by and movable along the post. The slider clamp comprises a tire engagement surface configured to engage a tire of the wheel of the bicycle supported by the bicycle rack. The post has or is securable in a fixed position relative to the first wheel tray. The post and the slider clamp are configured such that the tire engagement surface moves in a direction coincident with or parallel to the central plane in response to movement of the slider clamp along the post.

In some configurations, the post is supported for pivotable movement relative to the frame about a pivot axis, and wherein the direction passes through the pivot axis.

In some configurations, the post is configured to be secured in an operational position relative to the frame.

In some configurations, the post is movable to a stowed position relative to the frame.

In some configurations, in the operational position the post is generally perpendicular to a line passing through the axes of the wheels of the bicycle supported by the rack.

In some configurations, the frame comprises a linear tube and wherein in the operational position the post is generally perpendicular to the linear tube of the frame.

In some configurations, the frame comprises a linear tube and a hitch mount portion, wherein the linear tube is slideably supported by the hitch mount portion to allow for adjustment of the linear tube relative to the hitch mount portion.

In some configurations, the slider clamp comprises a support portion slideably supported by the post, wherein the support portion has a proximal extent nearest an end of the post supported by the frame and a distal extent further from the end of the post supported by the frame, wherein the tire engagement surface is positioned between the proximal extent and the distal extent along the post.

In some configurations, the slider clamp comprises a first wall spaced from a second wall, and wherein the post is positioned between the first wall and the second wall.

In some configurations, each of the first wall and the second wall include an opening located between the post and the tire engagement surface and in alignment with one another, wherein a handle that releases the slider clamp for movement relative to the post is located within the openings.

In some configurations, the slider clamp defines a hand engagement surface opposite the openings for grasping by a hand of a user of the bicycle rack.

In some configurations, the slider clamp comprises another hand engagement surface located on a surface opposite the tire engagement surface.

In some configurations, the frame comprises a mount portion configured to be received within the hitch receiver of the vehicle, wherein the mount portion comprises a wedge retention arrangement.

In some configurations, the wedge retention arrangement comprises a wedge member having a first angled surface that engages a second angled surface of the support portion of the bicycle rack, and a bolt that engages a nut, wherein the nut is secured to a hitch pin of the hitch receiver of the vehicle.

An aspect of the present disclosure involves a bicycle rack including a frame and a wheel tray supported by the frame. The wheel tray is configured to receive a wheel of a bicycle supported by the bicycle rack. A wheel clamp assembly is associated with the wheel tray. The wheel clamp assembly includes a post supported by the frame and a slider clamp supported by and movable along the post. The slider clamp comprises a tire engagement surface configured to engage a tire of the wheel of the bicycle supported by the bicycle rack. The post has or is securable in a fixed position relative to the wheel tray. The post and the slider clamp are configured such that the tire engagement surface moves in a direction coincident with or parallel to a lateral plane that passes through a center axis of the wheel of the bicycle supported by the bicycle rack in response to movement of the slider clamp along the post.

In some configurations, the post is supported for pivotable movement relative to the frame about a pivot axis, and wherein the direction passes through the pivot axis.

In some configurations, the post is configured to be secured in an operational position relative to the frame.

In some configurations, the post is movable to a stowed position relative to the frame.

In some configurations, in the operational position the post is generally perpendicular to a line passing through the axes of the wheels of the bicycle supported by the rack.

In some configurations, the frame comprises a linear tube and wherein in the operational position the post is generally perpendicular to the linear tube of the frame.

In some configurations, the frame comprises a linear tube and a hitch mount portion, wherein the linear tube is slideably supported by the hitch mount portion to allow for adjustment of the linear tube relative to the hitch mount portion.

In some configurations, the slider clamp comprises a support portion slideably supported by the post, wherein the support portion has a proximal extent nearest an end of the post supported by the frame and a distal extent further from the end of the post supported by the frame, wherein the tire engagement surface is positioned between the proximal extent and the distal extent along the post.

In some configurations, the slider clamp comprises a first wall spaced from a second wall, and wherein the post is positioned between the first wall and the second wall.

In some configurations, each of the first wall and the second wall include an opening located between the post and the tire engagement surface and in alignment with one another, wherein a handle that releases the slider clamp for movement relative to the post is located within the openings.

In some configurations, the slider clamp defines a hand engagement surface opposite the openings for grasping by a hand of a user of the bicycle rack.

In some configurations, the slider clamp comprises another hand engagement surface located on a surface opposite the tire engagement surface.

In some configurations, the frame comprises a mount portion configured to be received within the hitch receiver of the vehicle, wherein the mount portion comprises a wedge retention arrangement.

In some configurations, the wedge retention arrangement comprises a wedge member having a first angled surface that engages a second angled surface of the support portion of the bicycle rack, and a bolt that engages a nut, wherein the nut is secured to a hitch pin of the hitch receiver of the vehicle.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings.

DETAILED DESCRIPTION

Figure 1:
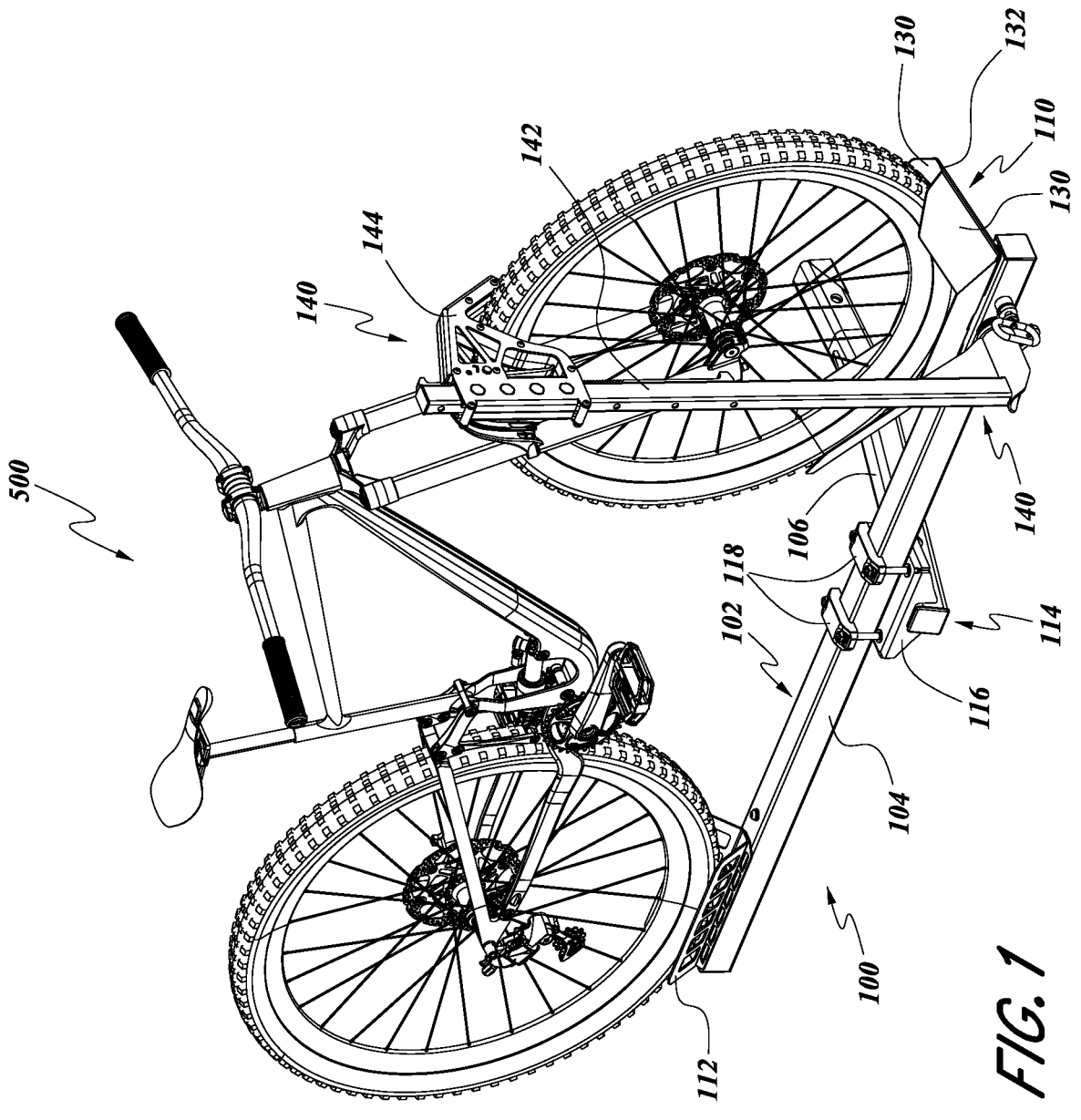
FIG. 1 is a rear perspective view of a bicycle rack having certain features, aspects and advantages of the present disclosure carrying a bicycle.
Figure 2:
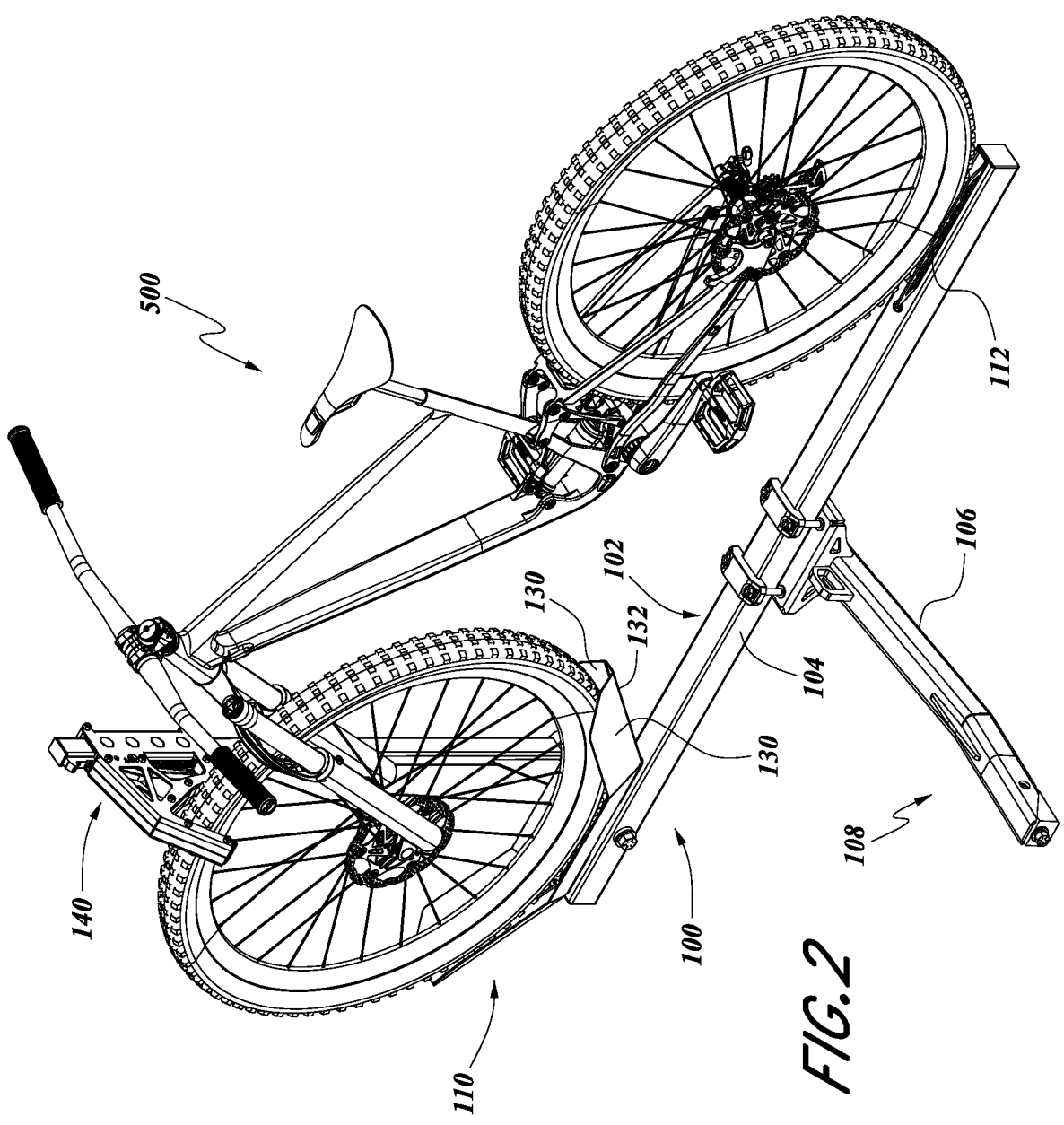
FIG. 2 is a front perspective view of the bicycle rack and bicycle of FIG. 1.

Embodiments of systems, components and methods of assembly and manufacture will now be described with reference to the accompanying Figures, wherein like numerals refer to like or similar elements throughout. Although several embodiments, examples and illustrations are disclosed below, it will be understood by those of ordinary skill in the art that the inventions described herein extends beyond the specifically disclosed embodiments, examples and illustrations, and can include other uses of the inventions and obvious modifications and equivalents thereof. The terminology used in the description presented herein is not intended to be interpreted in any limited or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

FIGS. 1-8 illustrate a bicycle rack 100 having certain features, aspects and advantages of the present disclosure. The bicycle rack 100 is configured to support a bicycle 500. The bicycle rack 100 includes a support structure or frame 102 configured to be attached to a vehicle (not shown)—in particular, to a hitch receiver of a vehicle. The frame 102 includes a first portion in the form of a lateral frame element or lateral frame tube 104 that is supported at or near a rearward end portion of a second portion in the form of a vehicle frame element or vehicle frame tube 106. In some configurations, the lateral frame tube 104 can be a linear tube and the vehicle frame tube 106 can be or include a hitch mount portion 108.

In some configurations, the lateral frame tube 104 is slideably supported by the vehicle frame tube 106 to allow for adjustment of the lateral frame tube 104 relative to the vehicle frame tube 106. Such an arrangement can allow for a position of a bicycle 500 carried by the bicycle rack 100 to be adjusted in a lateral direction relative to the vehicle to which the bicycle rack 100 is mounted. That is, the position of the bicycle 500 can be adjusted in a side-to-side direction of the vehicle by movement of the lateral frame tube 104 relative to the vehicle frame tube 106. In the illustrated arrangement, the lateral frame tube 104 is secured in a desired position relative to the vehicle frame tube 106 by a clamp assembly 114. The illustrated clamp assembly 114 includes a plate 116 attached to the vehicle frame tube 106 and at least one or a pair of clamp elements 118 that adjustably and removably connect to the plate 116, such as with mechanical fasteners. The lateral frame tube 104 is captured between the plate 116 and the pair of clamp elements 118.

In some configurations, the bicycle rack 100 can be configured to carry more than one bicycle 500. For example, the bicycle rack 100 could include multiple lateral frame tubes 104 carried by the vehicle frame tube 106 or other vehicle frame structure. In such arrangements, adjustment of the lateral frame tubes 104 can allow for the positions of adjacent bicycles 500 carried by the bicycle rack 100 to be adjusted relative to one another. In some configurations, the bicycle rack 100 is configured to receive an additional bicycle rack that is similar to the bicycle rack 100. For example, such an addition bicycle rack can be the same as or substantially the same as the illustrated bicycle rack 100 but includes a modified version of the vehicle frame tube 106 that is configured to be received in a rearward end portion of the vehicle frame tube 106 of the bicycle rack 100. In some configurations, multiple additional bicycle racks can be supported by the bicycle rack 100 in tandem fashion. In some configurations, multiple lateral frame tubes 104 and the other components of the rack 100 carried thereby can be carried by a single vehicle-frame-tube-like structure of an additional bicycle rack.

In alternative arrangements, the bicycle rack 100 can be configured to be otherwise mounted to a vehicle or other object. For example, the lateral frame tube 104 can be mounted directly or indirectly to a vehicle roof crossbar or within a truck bed. In some configurations, the frame comprises a linear tube and wherein in the operational position the post is generally perpendicular to the linear tube of the frame.

The bicycle rack 100 includes at least one wheel tray supported by the frame 102. In particular, the at least one wheel tray is supported by the lateral frame tube 104. In the illustrated arrangement, the bicycle rack 100 includes a first wheel tray, or a front wheel tray 110, and a second wheel tray, or a rear wheel tray 112 supported by the frame 102 at a spaced location from the front wheel tray 110. However, in some configurations this arrangement could be reversed or the bicycle 500 could be positioned in the bicycle rack 100 in a reverse orientation with the rear wheel of the bicycle 500 in the front wheel tray 110 and the front wheel of the bicycle 500 in the rear wheel tray 112. The bicycle rack 100 can be configured to clamp either or both wheels with the wheel clamp arrangement described further herein. Or, in the case of a rack configured for wheeled vehicles with more than two wheels (e.g., a tricycle), any one or more, including all, wheels of such a vehicle can be secured with a clamp arrangement.

Figure 3:
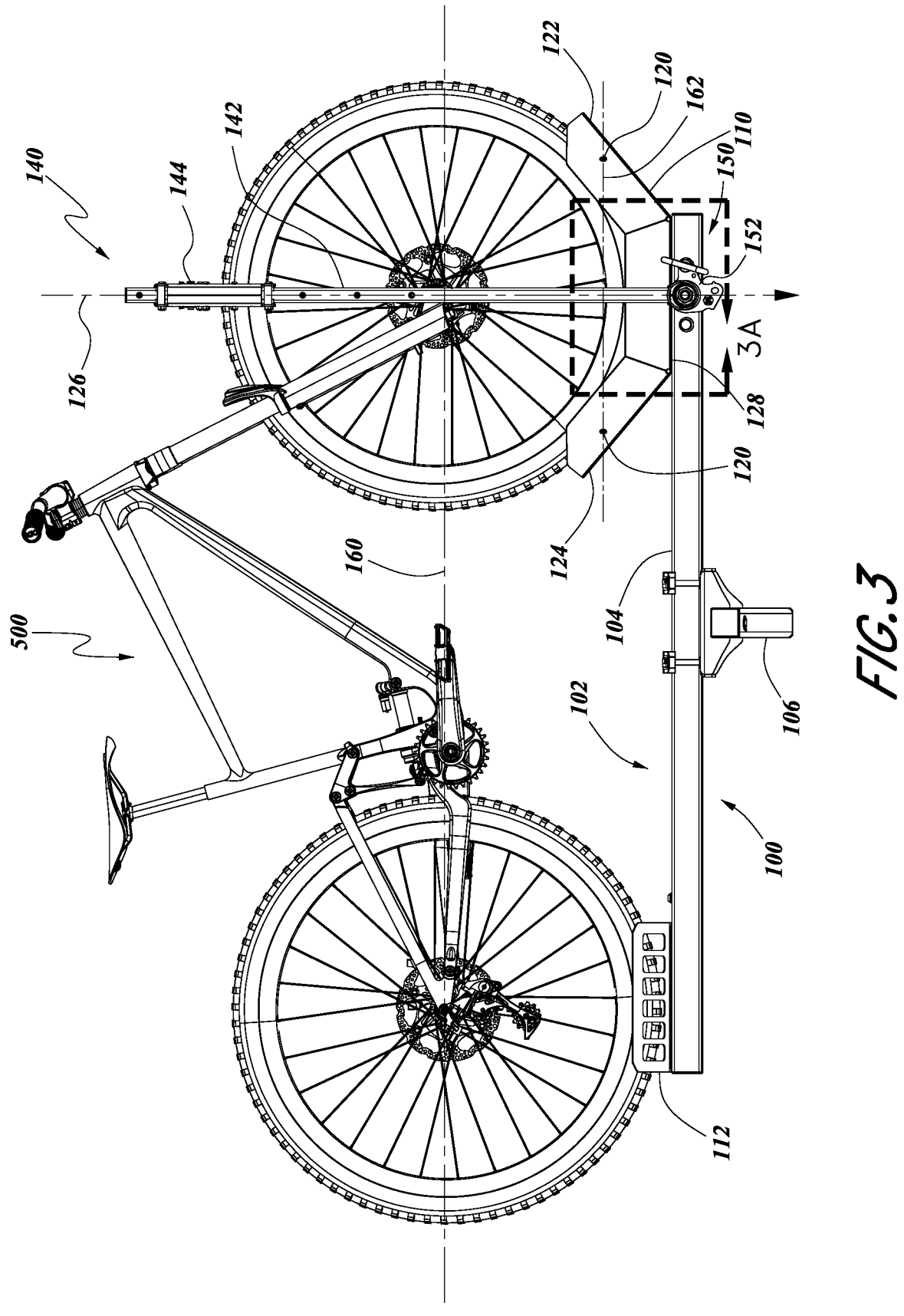
FIG. 3 is a rear view of the bicycle rack and bicycle of FIG. 1.
Figure 3A:
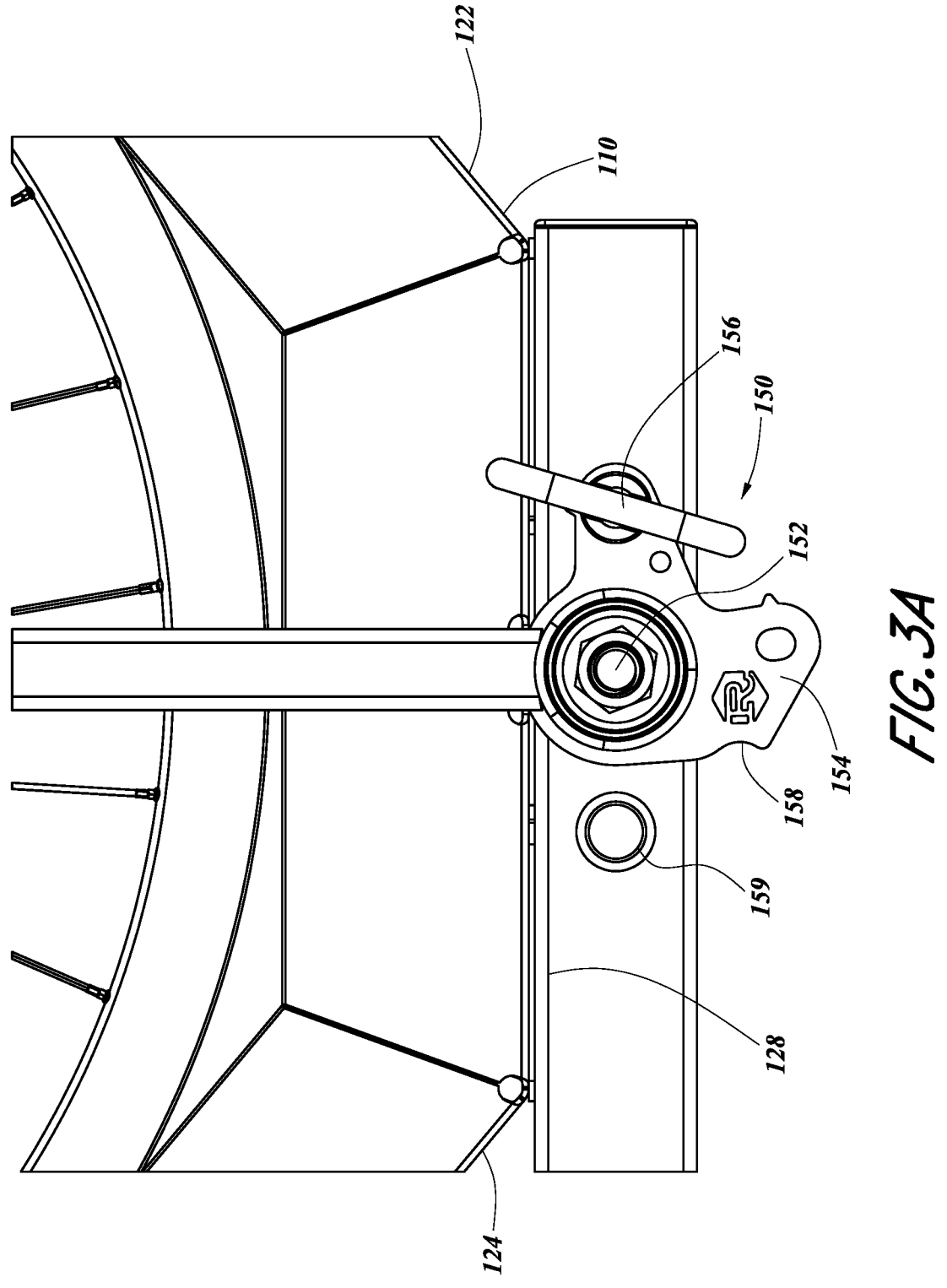
FIG. 3A is an enlarged view of a portion of bicycle rack identified by the dashed line box 3A in FIG. 3.
Figure 4:
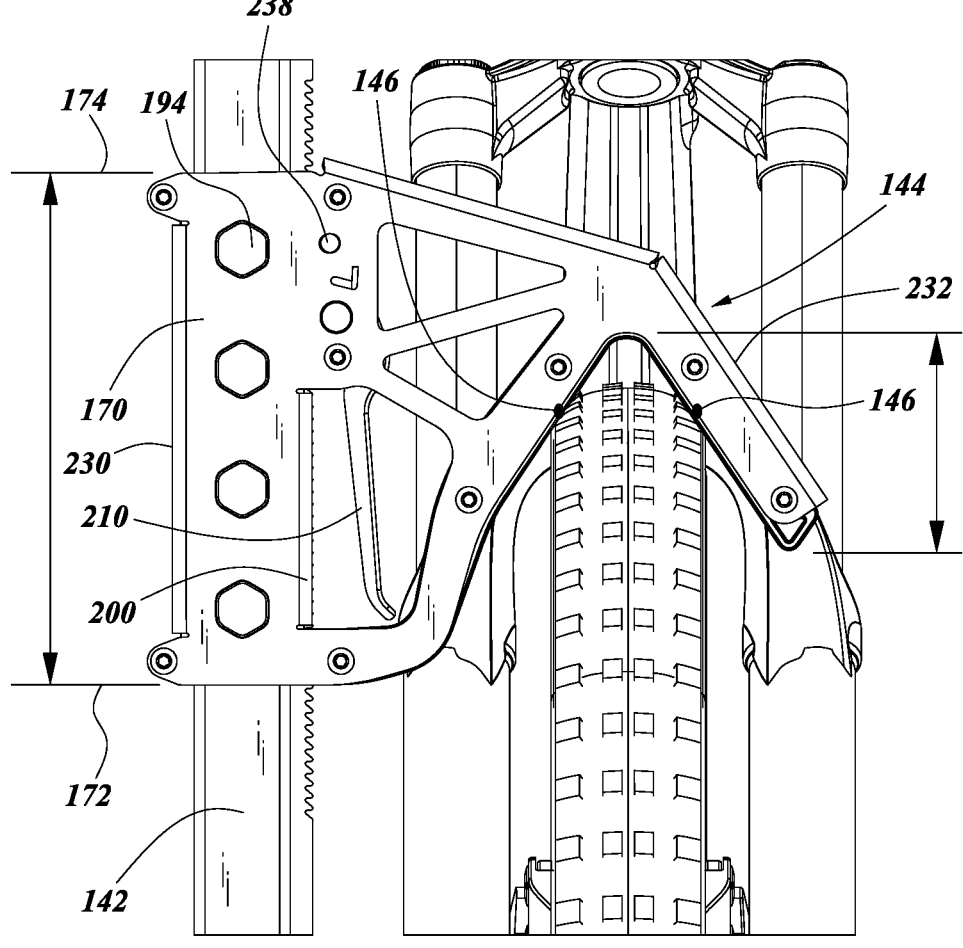
FIG. 4 is a side view of a portion of the bicycle rack and bicycle of FIG. 1 showing a wheel clamp assembly.

With particular reference to FIG. 3, the front wheel tray 110 is configured to receive a wheel (e.g., the front wheel) of the bicycle 500 supported by the bicycle rack 100 and to contact the wheel at least in a pair of locations 120 spaced from one another in a circumferential direction of the wheel. In the illustrated arrangement, the front wheel tray 110 comprises a first surface (e.g., a first ramp surface 122) and a second surface (e.g., a second ramp surface 124) facing one another to define a cavity configured to receive the wheel of the bicycle 500 supported by the bicycle rack 100. Preferably, one of the pair of locations 120 is located on each of the first ramp surface 122 and the second ramp surface 124. In the illustrated arrangement, the front wheel tray 110 is symmetrical or substantially symmetrical about a central plane 126 passing laterally through the first wheel tray. As used herein, a substantially symmetrical wheel tray 110 means a wheel tray 110 having substantial structure on each side of the central plane 126 to contact the front wheel of the bicycle 500 at the pair of locations 120 arranged as described herein to securely hold the bicycle wheel. In other configurations, the front wheel tray 110 could have other shapes, including non-symmetrical shapes. Although the illustrated ramp surfaces 122, 124 are linear or flat and separated by a flat central surface 128, the ramp surfaces 122, 124 could have other shapes, including non-flat or curved shapes.

As illustrated in FIG. 1, the illustrated front wheel tray 110 is constructed as a channel having opposing side walls 130, which engage opposing sides of the wheel of the bicycle 500 in a lateral direction of the bicycle 500 or in a direction aligned with a rotational axis of the wheel of the bicycle 500. The side walls 130 can be separated by a central wall 132. Accordingly, the locations 120 of contact between the wheel and each of the first ramp surface 122 and the second ramp surface 124 can be located on each of the side walls 130 of the front wheel tray 110. However, the locations 120 of one of the side walls 130 are discussed herein for simplicity. The locations 120 on each of the side walls 130 should be in the same locations or substantially similar locations when accounting for manufacturing variations. Thus, the discussion of the locations 120 on one side wall 130 will equally apply to the other side wall 130. The distance between the pair of locations 120 (both between the ramp surfaces 122, 124 and between the opposing side walls 130) can be influenced by the size of the wheel (e.g., 29 inch, 27.5 inch, or 26 inch) and/or the width of the tire of the wheel (e.g., 1 inch to 2.5 inches or greater). Typically, larger diameter or circumference wheels will result in a greater distance between the pair of locations 120 and smaller diameter or circumference wheels will result in a lesser distance between the pair of locations 120. With narrow tires, it is possible that the pair of locations 120 of contact between the wheel and the front wheel tray 110 will occur on the central wall 132 instead of the side walls 130.

A wheel clamp assembly 140 is associated with the front wheel tray 110. The wheel clamp assembly 140 is configured to secure the wheel of the bicycle 500 in the front wheel tray 110 by applying a force to a portion of the wheel opposite the front wheel tray 110 in a direction towards the front wheel tray 110. The illustrated wheel clamp assembly 140 includes a post 142 supported by the frame 102 and a slider clamp 144 supported by and movable along the post 142. The slider clamp 144 is movable toward a free end of the post 142 to facilitate loading of a bicycle 500 onto the bicycle rack 100 and is movable toward the fixed end of the post 142 to apply a force to the wheel of the bicycle 500 to secure the wheel within the front wheel tray 110. In the illustrated arrangement, the slider clamp 144 is aligned with the post 142 when the bicycle rack 100 is viewed from the rear. That is, the slider clamp 144 is centered or substantially centered with the post 142 when viewed from the rear. However, in other arrangements, at least a wheel-engaging portion of the slider clamp 144 can be offset (e.g., forward or rearward) from the post 142.

Figure 5:
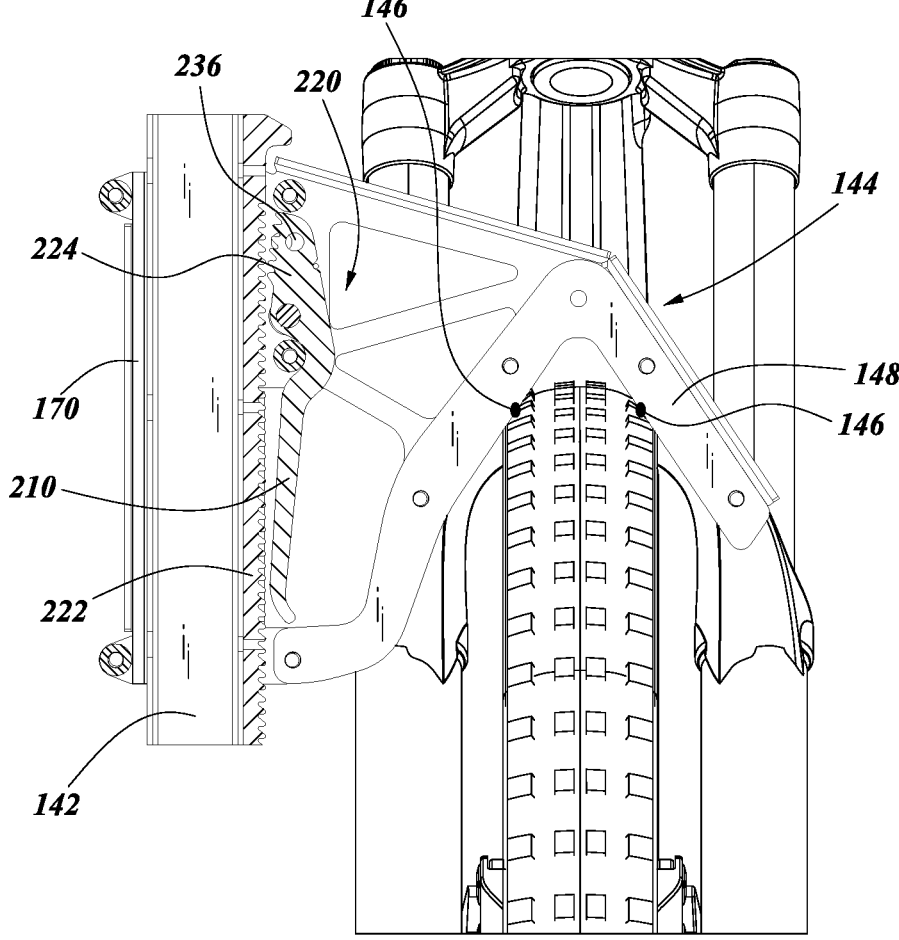
FIG. 5 is a partial sectional view of the wheel clamp assembly of FIG. 4 showing a lock arrangement in an unlocked position.
Figure 6:
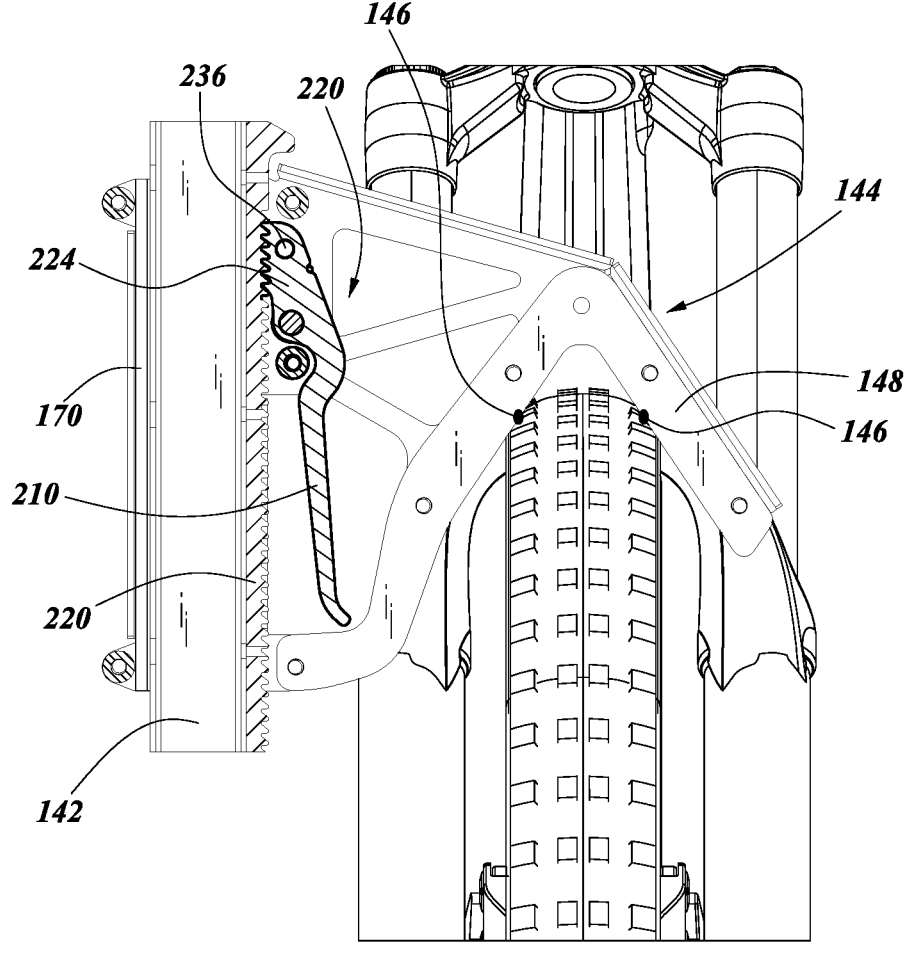
FIG. 6 is the partial sectional view of the wheel clamp assembly of FIG. 4 showing the lock arrangement in a locked position.
Figure 7:
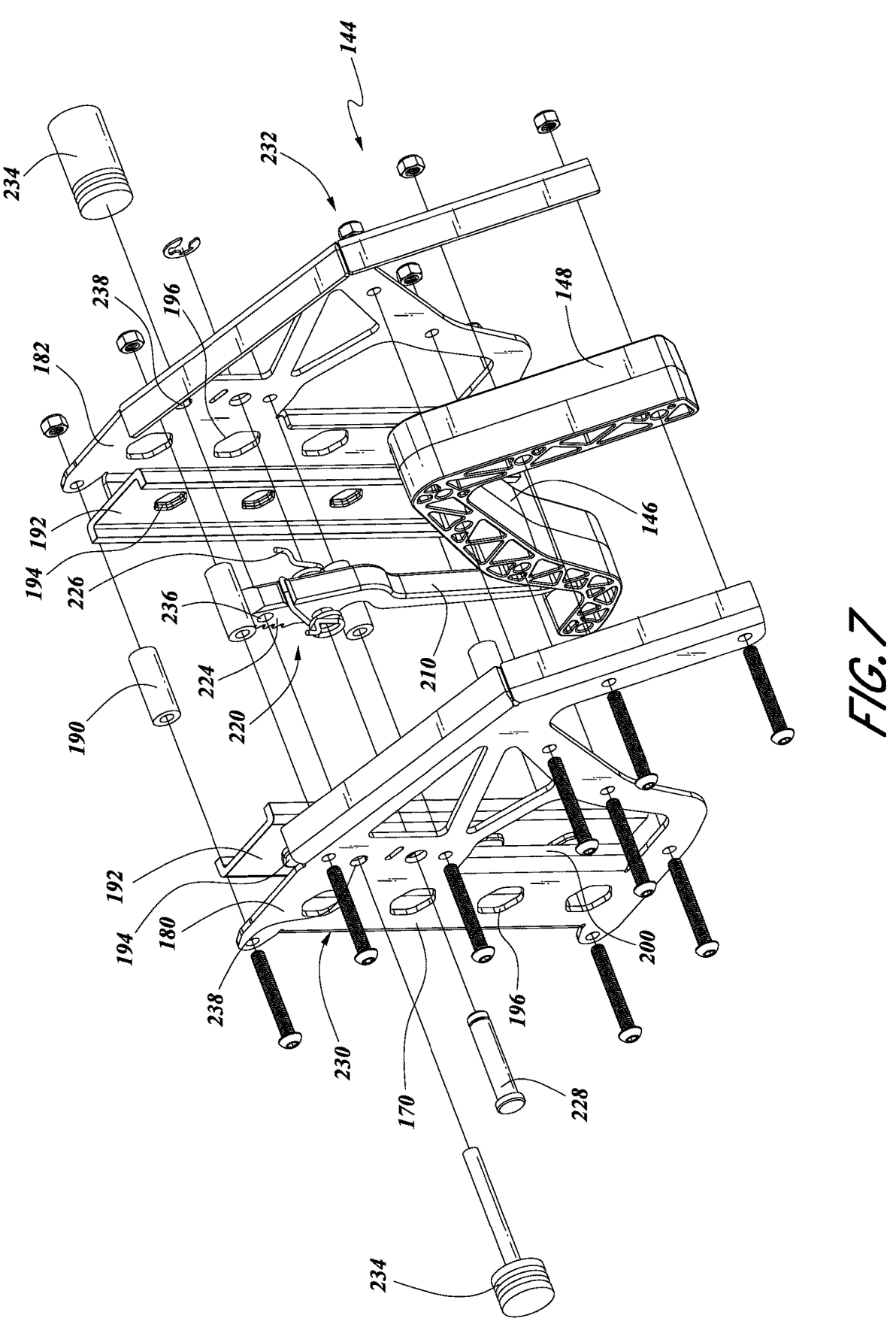
FIG. 7 is an exploded perspective view of the wheel clamp assembly of FIG. 4.

FIGS. 4-7 illustrate enlarged views of the slider clamp 144 and a portion of the post 142. In the illustrated arrangement, the slider clamp 144 comprises at least one tire engagement surface 146 configured to engage a tire of the wheel of the bicycle 500 supported by the bicycle rack 100. In the illustrated arrangement, the slider clamp 144 includes a V-shaped portion that supports one or more tire engagement blocks 148. In the illustrated arrangement, as shown in FIGS. 5-7, a single tire engagement block 148 is provided that defines a tire engagement surface 146 on each side of the block 148 and each side of the tire engaged by the block 148. However, in other configurations, a pair of opposing tire engagement blocks 148 can be provided, each of which define one of the tire engagement surfaces 146. Thus, the slider clamp 144 engages opposing sides of the tire as illustrated by the points in FIGS. 4-6. Although dots are shown for convenience, the tire engagement blocks will usually compress the tire such that the tire engages the tire engagement surfaces 146 along a length, rather than at a discrete point. The V-shape formed by the tire engagement surfaces 146 of the tire engagement blocks allows the slider clamp 144 to accommodate tires of different widths.

With additional reference to FIGS. 1 and 3, a direction of movement of the wheel clamp assembly 140 has a fixed position or orientation or can be secured in a fixed position or orientation relative to the front wheel tray 110 and the frame 102. In the illustrated arrangement, the post 142 is securable in a fixed position relative to the front wheel tray 110 and the frame 102 by a retention mechanism, such as a lock 150. In some configurations, the lock 150 is a pin-and-hole/detent-type lock. In some configurations, the post 142 is supported for pivotable movement relative to the frame 102 about a pivot axis 152.

In the illustrated arrangement, the post 142 is configured to be secured in an operational position relative to the frame 102 and/or the front wheel tray 110 by the lock 150. The lock 150 includes a lock plate 154 that is substantially L-shaped in the illustrated arrangement. Each end of the L-shaped lock plate 154 includes an opening through which a pin 156 can pass. The frame 102, in particular the lateral frame tube 104, includes a cavity configured to receive the pin 156. The openings of the lock plate 154 are located such that when the pin 156 is passed through one of the openings and into the cavity of the frame 102, the post 142 is secured in the operational position. When the pin 156 is passed through the other one of the openings and into the cavity of the frame 102, the post 142 is secured into a stowed position relative to the frame 102 and/or the front wheel tray 110 in which the post 142 is positioned adjacent to the lateral frame tube 104 or closer to the lateral frame tube 104 relative to the operational position. The stowed position can position the post 142 in substantial alignment with (e.g., +/−5 or 10 degrees) or substantially parallel to the lateral frame tube 104. In the illustrated arrangement, the post 142 can rotate in a forward direction—or away from the rear wheel tray 112—to facilitate loading of the bicycle 500 into the bicycle rack 100. The lock plate 154 includes a stop surface 158 that contacts a stop protrusion 159 to limit the forward rotation of the post 142.

In some configurations, in the operational position, the post 142 is generally vertical with the bicycle rack 100 in a normal use position as supported by a vehicle or with the lateral frame tube 104 in a horizontal orientation, which results in the bicycle 500 being in an upright horizontal position. In some configurations, in the operational position, the post 142 is perpendicular to a notional line 160 passing through the axes of the wheels of the bicycle 500 supported by the rack 100. In some configurations, in the operational position, the post 142 is perpendicular or substantially perpendicular to the lateral frame tube 104, such as a surface of the tube 104 (e.g., an upper surface or a lower surface), an axis of the lateral frame tube 104, or a line connecting two points on the lateral frame tube 104 (e.g., points defined by locations of trays or other wheel supports). The post 142 being perpendicular to the notional line 160 assumes bicycles 500 with the same size front and rear wheels. Some bicycles 500 utilize different size front and rear wheels. Accordingly, with such bicycles, the notional line 160 may be canted with respect to a notional line defined by surfaces of the trays 110, 112 (or other supports) upon which the tires of the wheels of the bicycle are supported. Therefore, the notional line 160 may be rotated a corresponding amount from perpendicular relative to the post 142 with such bicycles 500.

In some configurations, in the operational position, the post 142 is perpendicular or substantially perpendicular to a notional line 162 passing through the pair of locations 120. In some configurations, the notional lines 160, 162 are parallel to one another. As used herein with respect to a position of the post 142, "substantially perpendicular" means perpendicular within limits permitted by normal manufacturing variations of the relevant structures (e.g., the front wheel tray 110, the pivot 152, the wheel clamp assembly 140, and the front wheel of the bicycle 500). Within such limits, the post 142 can be expected to be within five (5) degrees in either direction of perpendicular to one or both of the notional lines 160, 162 for a total spread of ten (10) degrees. In some configurations, the post 142 can be expected to be within five (5) degrees, within three (3) degrees, or within two (2) degrees in either direction of perpendicular to one or both of the notional lines 160, 162 for a total spread of ten (10) degrees. Moreover, the post 142 being perpendicular to or substantially perpendicular to the notional line(s) 160, 162 assumes alignment of the wheel clamp assembly 140 with the post 142, as described above.

In other words, the wheel clamp assembly 140 lies within the same plane as the post 142 when the bicycle rack 100 is viewed from the rear. In such configurations, the post 142 can be used as a proxy for a direction of force applied to the wheel of the bicycle 500 by the wheel clamp assembly 140. In configurations in which the wheel clamp assembly 140 is offset from the post 142, a line passing through the wheel clamp assembly 140 and the pivot 152 can be perpendicular to or generally perpendicular to the notional line(s) 160, 162. Such a line reflects a direction of force applied to the wheel of the bicycle 500 by the wheel clamp assembly 140.

As described above, the wheel clamp assembly 140 is configured to apply a force to the wheel of the bicycle 500, which is positioned within the front wheel tray 110 that securely holds the wheel within the front wheel tray 100 and, thus, secures or provides the majority of the forces necessary to secure the bicycle 500 to the bicycle rack 100. In some configurations, wheel clamp assembly 140, including but not limited to, the post 142 and the slider clamp 144 are configured such that the tire engagement surface(s) 146 of the tire engagement block(s) moves in a direction substantially coincident with or substantially parallel to the central plane 126 in response to movement of the slider clamp 144 along the post 142. In some such configurations, the tire engagement surface(s) 146 moves in a direction substantially coincident with or substantially parallel to a lateral plane that passes through a center axis of the wheel of the bicycle 500 in response to movement of the slider clamp 144 along the post 142. Such a lateral vertical plane may be vertical when the bicycle 500 and/or lateral frame tube 104 is horizontal or may be perpendicular to one or both of the notional lines 160, 162. Accordingly, the central plane 126 is used as a convenience here to refer to a direction of the clamping force applied to the front wheel (or other wheel) of the bicycle 500 that is held within the wheel tray 110 as the force is substantially contained within the central plane 126. Thus, the direction of the force can be referred to herein by the reference number 126.

In some configurations, the post 142 and the slider clamp 144 are configured such that the tire engagement surface(s) 146 applies the force to the wheel in a direction 126 (e.g., along the post 142) that extends between the pair of locations 120. In some configurations, the direction 126 extends within a center third of a distance between the pair of locations 120. The direction 126 can extend through a center point of a distance between the pair of locations 120. The direction 126 can pass through the pivot axis 152.

As discussed above, the distance between the pair of locations 120 can vary with characteristics of the wheel, such as a size (diameter) of the wheel, a size (e.g., width) of the tire on the wheel, or characteristics of the tire (e.g., slick or knobby). The distance between the pair of locations 120 can add to the stability of the wheel of the bicycle 500 within the front wheel tray 110. Sufficient stability of the wheel within the wheel tray 110 is beneficial for the stability of the bicycle 500 within the illustrated bicycle rack 100, in which the wheel clamp assembly 140 contacts the top or uppermost portion of the bicycle tire at or near a center of the tire. Such an arrangement contrasts with conventional bicycle racks, which tend to contact the bicycle tire substantially off-center. However, although the distance between the pair of locations 120 can vary with the actual bicycle 500 used with the bicycle rack 100, most adult bicycles use wheels between twenty-six (26) and twenty-nine (29) inches in diameter, which results in a relatively small range of distances between the pair of locations 120 as a practical matter. Furthermore, the bicycle rack 100 is also capable of providing sufficient stability and retention for bicycles having smaller wheels, such as children's bicycles.

In some configurations, the pair of locations 120 measured using a twenty-nine (29) inch bicycle wheel or equivalent circle can have any one or more of the characteristics or dimensions described in this paragraph. In some configurations, the distance between the pair of locations 120 is at least about twelve (12) or at least about fourteen (14) or fifteen (15) inches for a relatively small diameter bicycle wheel. In some configurations, the distance between the pair of locations 120 is at least about sixteen (16) or at least about seventeen (17) or eighteen (18) inches for a relatively large diameter bicycle wheel. In some configurations, the distance between the pair of locations 120 is between about twelve (12) and about twenty-four (24) inches, between about fourteen (14) and about twenty-two (22) inches, or between about fourteen (14) and about twenty (20) inches. In some configurations, the notional line 162 that passes through the pair of locations 120 is located at least about four (4), five (5) or six (6) inches from the bottom or lowermost extent of the bicycle wheel or from the pivot axis 152. In some configurations, the notional line 162 is located between about three (3) and about ten (10) inches, between about four (4) and about eight (8) inches, or between about four (4) and about six (6) inches from the bottom or lowermost extent of the bicycle wheel or from the pivot axis 152.

With reference to FIGS. 4-7, the slider clamp 144 preferably is configured to smoothly slide along the post 142 without excessive rocking or binding to provide a good user experience when loading bicycles 500 onto and unloading bicycles 500 from the bicycle rack 100. In the illustrated arrangement, the slider clamp 144 includes a support portion 170 that engages the post 142 for sliding movement relative to the post 142. The support portion 170 can have a proximal extent 172 nearest an end of the post 142 supported by the frame 102 and a distal extent 174 further from the end of the post 142 supported by the frame 102. In some configurations, the tire engagement surface(s) 146 is positioned between the proximal extent 172 and the distal extent 176 along the post 142. Such an arrangement can facilitate smooth movement of the slider clamp 144 along the post 142 without rocking or binding, especially under conditions in which the slider clamp 144 is applying a force to the tire of the wheel of the bicycle 500.

In the illustrated arrangement, the slider clamp 144 includes a truss structure between the support portion 170 and the tire engagement surfaces(s) 146, which provides high strength with low weight. The slider clamp 144 can be formed by a spaced-apart wall structure, which also provides high strength with low weight. In the illustrated arrangement, the slider clamp 144 includes a first wall 180 spaced from a second wall 182 as shown in FIG. 7. The post 142 can be positioned between the first wall 180 and the second wall 182. Furthermore, the tire engagement block defining the tire engagement surface(s) 146 can be positioned between the first wall 180 and the second wall 182. The first wall 180 and the second wall 182 can be spaced apart by side wall portions of the first wall 180 and/or the second wall. The first wall 180 and the second wall 182 can be spaced apart by one or more spacers 190. In some configurations, the spacers 190 also secure or assist in securing the first wall 180 and the second wall 182 to one another. Some of the spacers 190 can extend through the tire engagement blocks defining the tire engagement surface(s) 146. The first wall 180 and the second wall 182 can be constructed from a metal material, such as metal sheet material that is provided with a desired shape by any suitable process. However, other materials and configurations (e.g., single structure) can be used.

In the illustrated arrangement, the slider clamp 144 includes slide members, such as slide blocks or slide strips 192 that facilitate sliding of the slider clamp 144 relative to the post 142 and to reduce wear on either portion. The slide strips 192 can be made from a suitable low friction and/or high wear material, such as nylon, acetal, or polyimide. The slide strips 192 can include one or more protrusions 194 that register with apertures 196 of the first wall 180 and the second wall 182, or vice versa, to fix the slide strips 192 for movement with the first wall 180 and the second wall 182.

In the illustrated arrangement, each of the first wall 180 and the second wall 182 include an opening 200 located between the post 142 and the tire engagement surface(s) 146 of the tire engagement blocks. The openings 200 are in alignment with one another to create an opening 200 of the slider clamp 144. The opening 200 allows access to a handle 210 that releases the slider clamp 144 for movement relative to the post 142. By locating the handle 210 within the opening 200, the handle 210 is protected from damage and/or accidental actuation.

The handle 210 is part of an adjustable lock 220 that permits the slider clamp 144 to be secured at a desired one of a plurality of positions along the post 142 to adjust to different sizes of the wheel of the bicycle 500. In the illustrated arrangement, the adjustable lock 220 includes a rack-and-pinion arrangement with a rack 222 connected to or formed by the post 142 and an engagement portion or a pinion 224 connected to or formed by an end of the handle 210. The adjustable lock 220 can be configured to permit movement of the slider clamp 144 towards the end of the post 142 supported by the frame 102 and inhibit or prevent movement of the slider clamp 144 away from the end of the post 142 supported by the frame 102. Rotation of the handle 210, such as by a user grasping the handle 210, releases the pinion 224 from the rack 222 and permits movement of the slider clamp 144 away from the end of the post 142 supported by the frame 102. In the illustrated arrangement, the pinion 224 includes a plurality of gear teeth configured to engage a plurality of gear teeth of the rack 222. A spring or other biasing element 226 can be configured to bias the handle 210 into the locked position. The handle 210 can be pivotally supported by a pin and circlip 228. Although a rack-and-pinion arrangement is illustrated, other types of locking arrangements, such as one-way locks, can be utilized.

The slider clamp 144 can be shaped or otherwise configured to define a hand engagement surface 230 opposite the opening 200 for grasping by a hand of a user of the bicycle rack 100. The slider clamp 144 can also include another hand engagement surface 232 located on a surface generally opposite and above (i.e., opposite the end of the post 142 supported by the frame 102) the tire engagement surface 146. Such an arrangement can provide locations for each hand of a user of the bicycle rack 100 to apply a force to the slider clamp 144 such that the wheel of the bicycle 500 is securely held against the front wheel tray 110 and within bicycle rack 100.

In some configurations, the handle 210 can be secured in the locked position by a supplemental lock 234. Such an arrangement can inhibit or prevent theft of a bicycle 500 carried by the bicycle rack 100. The lock 234 can pass through an opening 236 in the handle 210 and corresponding openings 238 in the slider clamp 144 to prevent the handle 210 from moving to the unlocked position and, thus, preventing the wheel clamp assembly 140 from moving away from the bicycle wheel thereby allowing the bicycle 500 to be removed from the bicycle rack 100.

The rear wheel tray 112 can be an elongate tray such that the bicycle rack 100 can receive bicycles 500 of different wheelbases (distance between the axles of the wheels) without adjustment of a position of the rear wheel tray 112 on the frame 102 or lateral frame tube 104. The rear wheel tray 112 can include a plurality of aligned openings 250 on each side of the tray 112, which can receive a retention member (not shown) to keep the rear wheel of the bicycle 500 within the rear wheel tray 112. The retention member can be any type of strap or other element configured to be formed in a partial or entire loop around the rear wheel and passing through one or more of the openings 250. Other types of rear wheel trays 112 could also be used. For example, the tray 112 could be shorter and configured for adjustment along the lateral frame tube 104. The tray 112 could also include a ramp surface on one or both ends or could otherwise have or include a U-shape or J-shape.

In some configurations, at least a portion of the support structure 102 supporting the bicycle 500 is configured to be swingable relative to the vehicle. That is, the frame 102 can have a first portion connected to the vehicle and a second portion that carries the bicycle 500 and is swingable relative to the first portion. In other configurations, the bicycle rack 100 is coupled to a swingable accessory mount, such as that illustrated in FIGS. 1-3 and described in Applicant's U.S. Patent Publication No. 2020/0114988, the entirety of which is incorporated by reference herein and made a part of the present disclosure.

Figure 8:
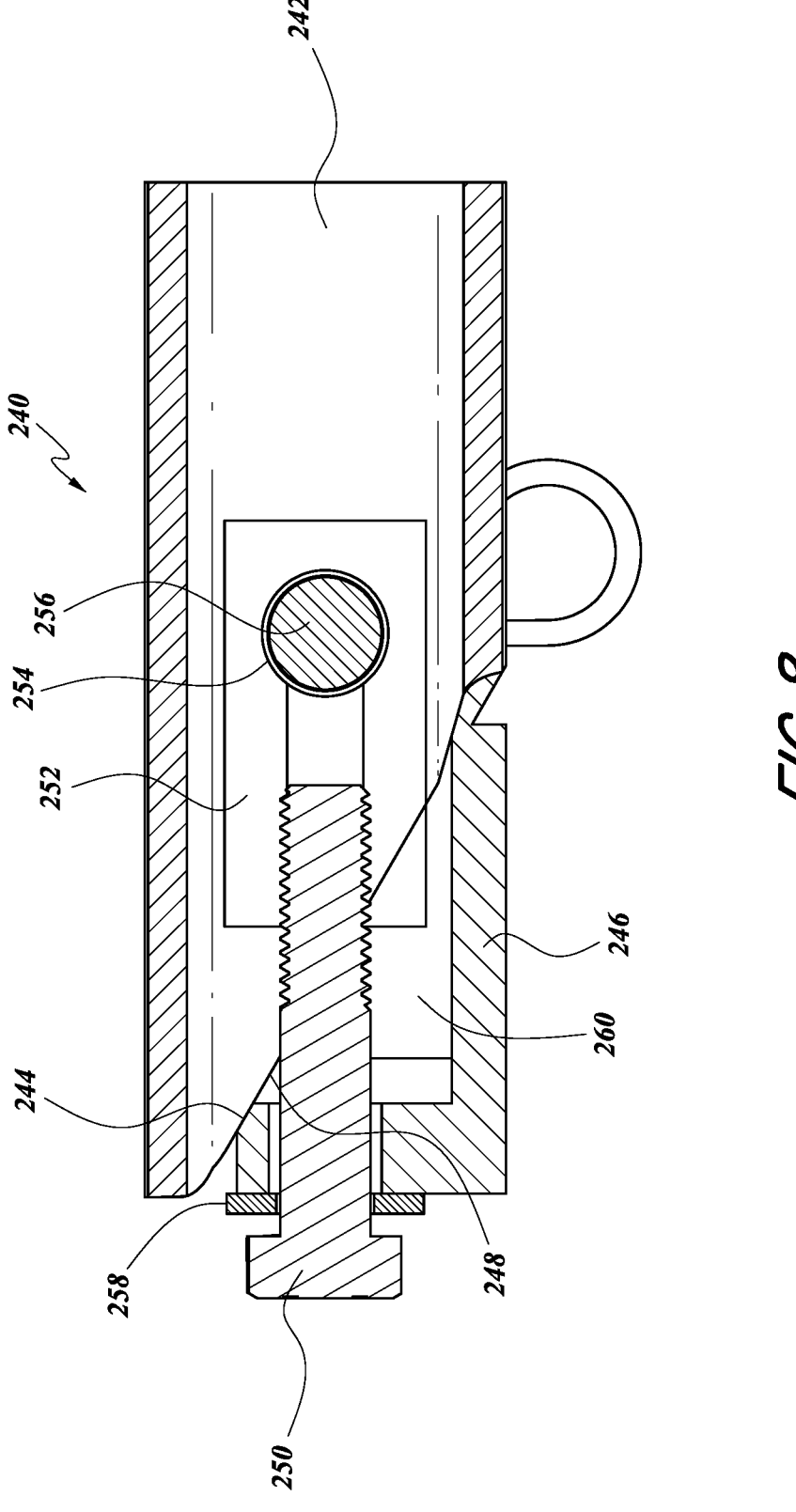
FIG. 8 is a sectional view of a retention arrangement for a mounting portion of the bicycle rack configured to engage a hitch receiver of a vehicle.

With reference to FIG. 8, the bicycle rack 100 is secured to the hitch receiver (not shown) of the vehicle by the retention arrangement 240. However, the retention arrangement 240 could also be used to secure other objects or assemblies to the hitch receiver. The hitch receiver includes an outer wall defining an interior space. The retention arrangement 240 includes a hitch insert 242 configured to be inserted into the interior space of the hitch receiver. The hitch insert 242 includes a first angled surface 244. A wedge block 246 includes a second angled surface 248.

The retention arrangement 240 also includes a bolt 250 and a nut 252. The nut 252 includes a through-hole 254 (FIG. 8) configured to receive a hitch receiver pin 256 to secure the nut 252 relative to the hitch receiver. In use, the bolt 250 is engaged with the nut 252 and the second angled surface 248 of the wedge block 246 contacts the first angled surface 244 of the hitch insert 242. The bolt 250 applies a force to the wedge block 246 through a washer 258 to move the wedge block 246 relative to the hitch insert 242 with the first angled surface 244 sliding along the second angled surface 248 such that opposing surfaces of the hitch insert 242 and the wedge block 246 are forced against the opposing sides of the outer wall of the hitch receiver to secure the hitch insert 242 to the hitch receiver.

If desired, a spherical washer set could be interposed between a head of the bolt 250 and the wedge block 246. The spherical washer set allows an angle of the bolt 250 to vary somewhat relative to the wedge block 246 to accommodate the sliding movement of the wedge block 246 relative to the hitch insert 242, which rotates the nut 252 about an axis of the hitch receiver pin 256.

In some configurations, the hitch insert 242 extends from a first end of the hitch receiver towards the bicycle rack 100 or other apparatus and the bolt 250 is accessible from a second end of the hitch receiver opposite the first end. A longitudinal axis of the bolt 250 can be aligned with a longitudinal axis of the hitch receiver. In some configurations, a longitudinal axis of the bolt 250 is perpendicular with a longitudinal axis of the hitch receiver pin 256. In some configurations, the wedge block 246 comprises a recess 260 configured to accommodate a portion of the nut 222.

CONCLUSION

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

What is claimed is:

1. A bicycle rack, comprising:
a frame;
a wheel tray supported in a fixed location by the frame, wherein the wheel tray is configured to receive a wheel of a bicycle supported by the bicycle rack and to contact the wheel in a pair of locations spaced from one another in a circumferential direction of the wheel;
a wheel clamp assembly associated with the wheel tray, the wheel clamp assembly comprising:
a post supported by the frame comprising a proximal end supported by the frame and a distal end opposite the proximal end, wherein the post has a fixed rotational position or is securable in a fixed rotational position by a retention mechanism of the bicycle rack; and
a slider clamp supported by and movable along the post, wherein the slider clamp comprises a tire engagement surface configured to engage a tire of the wheel of the bicycle supported by the bicycle rack;
wherein the post and the slider clamp are configured such that the tire engagement surface applies a force to the wheel in a direction that extends between the pair of locations;
wherein the slider clamp comprises a support portion slideably supported by the post, wherein the support portion has a proximal extent nearest the proximal end of the post supported by the frame and a distal extent further from the proximal end of the post supported by the frame, wherein the tire engagement surface is positioned between the proximal extent and the distal extent along the post; and
wherein the distal end of the post extends beyond the distal extent of the slider clamp; and
wherein the slider clamp comprises a first wall spaced from a second wall, and wherein the post is positioned between the first wall and the second wall; and
wherein each of the first wall and the second wall include an opening located between the post and the tire engagement surface and in alignment with one another, wherein a handle that releases the slider clamp for movement relative to the post is located within the opening.

2. The bicycle rack of claim 1, wherein the direction extends through a center point of a distance between the pair of locations.

3. The bicycle rack of claim 1, wherein the post is supported for pivotable movement relative to the frame about a pivot axis, and wherein the direction passes through the pivot axis.

4. The bicycle rack of claim 3, wherein in an operational position the post is generally perpendicular to a line passing through axes of the wheels of the bicycle supported by the bicycle rack.

5. The bicycle rack of claim 3, wherein the frame comprises a linear tube and wherein in an operational position the post is generally perpendicular to the linear tube of the frame.

6. The bicycle rack of claim 1, wherein the frame comprises a linear tube and a hitch mount portion, wherein the linear tube is slideably supported by the hitch mount portion to allow for adjustment of the linear tube relative to the hitch mount portion.

7. The bicycle rack of claim 1, wherein the slider clamp defines a hand engagement surface opposite the opening for grasping by a hand of a user of the bicycle rack.

8. The bicycle rack of claim 7, wherein the slider clamp comprises another hand engagement surface located on a surface opposite the tire engagement surface.

9. The bicycle rack of claim 1, wherein the frame comprises a mount portion configured to be received within a hitch receiver of a vehicle, wherein the mount portion comprises a wedge retention arrangement.

10. The bicycle rack of claim 9, wherein the wedge retention arrangement comprises a wedge member having a first angled surface that engages a second angled surface of the support portion of the bicycle rack, and a bolt that engages a nut, wherein the nut is secured to a hitch pin of the hitch receiver of the vehicle.

11. The bicycle rack of claim 1, wherein the retention mechanism is a pin-and-hole.

12. The bicycle rack of claim 1, wherein the retention mechanism is a detent-type lock.

13. A bicycle rack, comprising:
a frame;
a wheel tray supported by the frame, wherein the wheel tray is configured to receive a wheel of a bicycle supported by the bicycle rack and to contact the wheel at least in a pair of locations spaced from one another in a circumferential direction of the wheel;
a wheel clamp assembly associated with the wheel tray, the wheel clamp assembly comprising:
a post supported by the frame; and
a slider clamp supported by the post, the slider clamp comprising;
a pair of tire engagement surfaces that cooperate to define a tire-receiving space configured to receive a tire of the wheel of the bicycle supported by the bicycle rack, wherein the tire-receiving space reduces in width in a direction from a proximal extent to a distal extent of the tire-receiving space; and
an enclosed opening having a complete perimeter defined by the slider clamp and configured to receive a portion of a user's hand, wherein at least a portion of the opening is positioned between the tire-receiving space and the post.

14. The bicycle rack of claim 13, further comprising a lever located within the opening.

15. The bicycle rack of claim 14, wherein the lever pivots about a pivot point.

16. The bicycle rack of claim 15, wherein the lever comprises a free end located below the pivot point.

17. The bicycle rack of claim 14, wherein the lever actuates a mechanism that releases a locked position of the slider clamp.

18. The bicycle rack of claim 13, wherein an upper end of the slider clamp defines a substantially flat upper surface configured to allow a user of the bicycle rack to apply a downward force to the slider clamp.

19. The bicycle rack of claim 18, wherein the upper surface extends downward from the distal extent toward the tire-receiving space.

20. The bicycle rack of claim 18, wherein the pair of tire engagement surfaces are formed from a material that is different from a material that forms the upper surface of the slider clamp.

21. The bicycle rack of claim 18 further comprising an outward-facing surface located on an opposite side of the slider clamp from the post, wherein the outward-facing surface extends downward from the upper surface, wherein an upper end of the outward-facing surface is located above the tire-receiving space and a lower end of the outward-facing surface is below an uppermost extent of the tire-receiving space.

* * * * *